United States Patent
Rangegowda et al.

(10) Patent No.: US 8,364,983 B2
(45) Date of Patent: Jan. 29, 2013

(54) CORRALLING VIRTUAL MACHINES WITH ENCRYPTION KEYS

(75) Inventors: Dharshan Rangegowda, Seattle, WA (US); Robert M. Fries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1106 days.

(21) Appl. No.: 12/117,059

(22) Filed: May 8, 2008

(65) Prior Publication Data

US 2009/0282266 A1  Nov. 12, 2009

(51) Int. Cl.
 G06F 12/14 (2006.01)
 H04L 29/06 (2006.01)
(52) U.S. Cl. .................................. 713/193; 713/165
(58) Field of Classification Search .................. 713/165, 713/193
 See application file for complete search history.

(56) References Cited

U.S. PATENT DOCUMENTS

| | | | |
|---|---|---|---|
| 7,203,808 B2 | 4/2007 | Rothman et al. | |
| 7,987,497 B1 * | 7/2011 | Giles et al. | 726/2 |
| 2005/0268336 A1 | 12/2005 | Finnegan | |
| 2006/0174109 A1 | 8/2006 | Flynn | |
| 2007/0180239 A1 * | 8/2007 | Fujibayashi et al. | 713/165 |
| 2007/0180257 A1 | 8/2007 | Bae et al. | |
| 2007/0198656 A1 | 8/2007 | Mazzaferri et al. | |
| 2007/0204166 A1 | 8/2007 | Tome et al. | |
| 2007/0226786 A1 * | 9/2007 | Berger et al. | 726/9 |
| 2007/0260831 A1 * | 11/2007 | Michael et al. | 711/162 |
| 2007/0283169 A1 | 12/2007 | Locker et al. | |
| 2008/0005171 A1 | 1/2008 | Cameron | |

OTHER PUBLICATIONS

"Terra: A Virtual Machine-Based Platform for Trusted Computing," by Tal Garfinkel, Ben Pfaff, Jim Chow, Mendel Rosenblum and Dan Boneh, Computer Science Department, Stanford University, Copyright 2003, 14 pgs. [online] [retrieved on Jan. 9, 2008]. Retrieved from the Internet: http://citeseer.ist.psu.edu/cache/papers/cs/30314/http:zSzzSzwww.stanford.eduzSz~talgzSzpaperszSzSOSP03z Szterra.pdf/garfinkel03terra.pdf.

"Truecrypt—The Best Real Time Virtual Disk Encryption Security," Author Unknown, Creation Date Unknown, pp. 1-4 [online] [retrieved on Jan. 10, 2008]. Retrieved from the Internet: http://appaholic.wordpress.com/2007/10/05/truecrypt-the-best-real-time-virtual-disk-encryption-security/.

A <virtual_machine_name>Could Not Be Started Because Access Was Denied to One of the Virtual Hard Disks Entry is Logged in the Virtual Server Log When the Computer Restarts, Author Unknown, Microsoft Corporation, Copyright 2008, pp. 1-2 [online] [retrieved on Jan. 10, 2008]. Retrieved from the Internet: http://support.microsoft.com/kb/890324.

(Continued)

*Primary Examiner* — Peter Shaw
(74) *Attorney, Agent, or Firm* — Workman Nydegger

(57) ABSTRACT

A virtual machine comprises a unique identifier that is associated with one or more encryption keys. A management server encrypts the virtual machine's virtual hard disk(s) using the one or more associated encryption keys. The management server further provides the one or more encryption keys to a limited number of one or more servers in a system. Only those one or more servers that have been provided the one or more encryption keys can be used to load, access, and/or operate the virtual machine. The management server can thus differentiate which virtual machines can be operated on which servers by differentiating which servers can receive which encryption keys. In one implementation, a management server encrypts all virtual machines in the system, but encrypts virtual machines with sensitive data with a limited set of encryption keys, and further provides those encryption keys to a limited set of trusted servers.

14 Claims, 5 Drawing Sheets

OTHER PUBLICATIONS

"Virtual Machine Encryption Basics," Author Unknown, VMWare, Inc., Copyright 1998-2005, pp. 1-5 [online] [retrieved on Jan. 10, 2008]. Retrieved from the Internet: http://www.vmware.com/pdf/ace_encrypt_bg.pdf.

"Virtual Machine Security Guidelines Version 1.0," Author Unknown, The Center for Internet Security, Copyright 2001-2007, 30 pgs. [online] [retrieved on Jan. 10, 2008]. Retrieved from the Internet: http://www.cisecurity.org/tools2/vm/CIS_VM_Benchmark_v1.0.pdf.

* cited by examiner

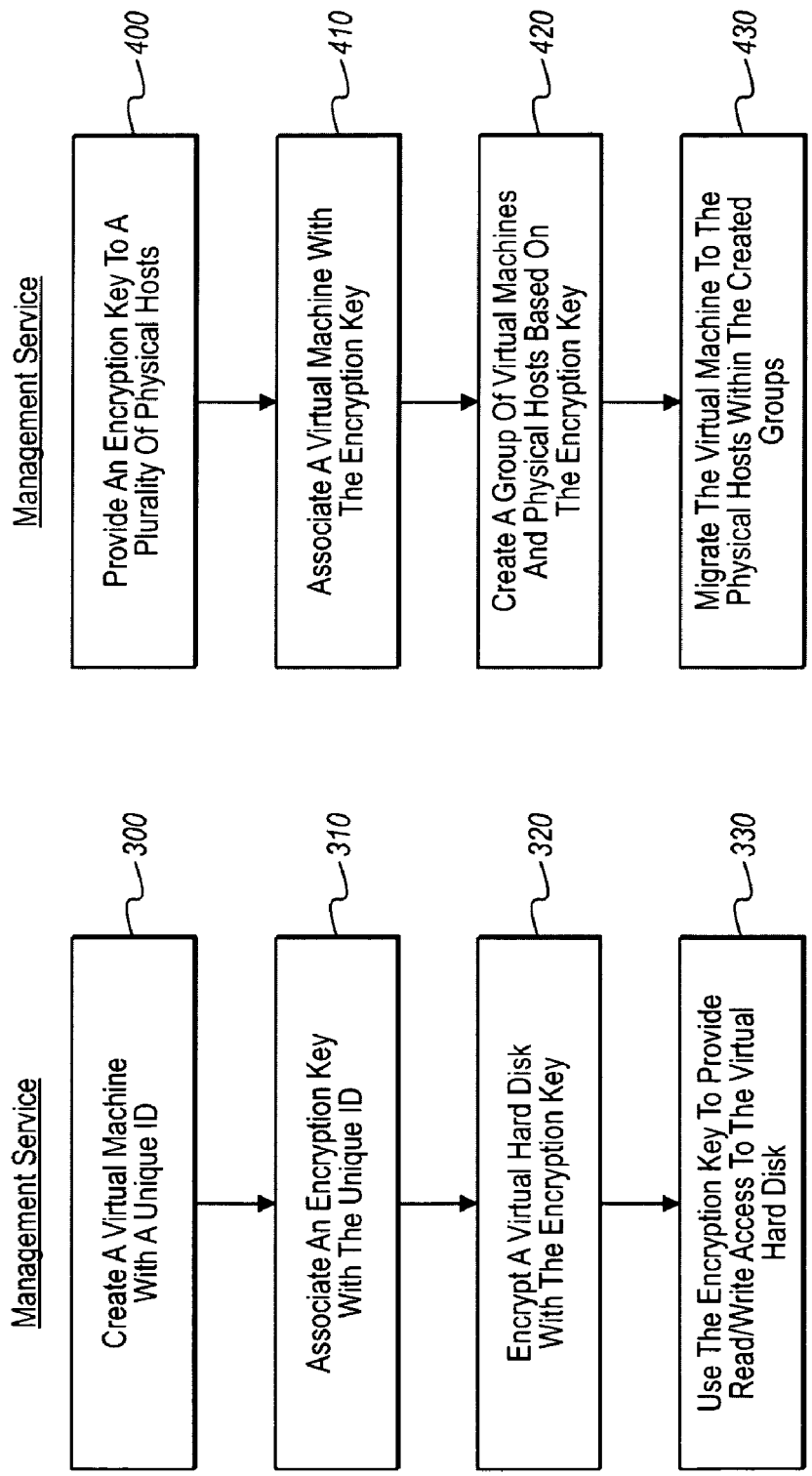

CORRALLING VIRTUAL MACHINES WITH ENCRYPTION KEYS

CROSS-REFERENCE TO RELATED APPLICATIONS

N/A

BACKGROUND

Background and Relevant Art

Conventional computer systems are now commonly used for a wide range of objectives, whether for productivity, entertainment, or the like. One reason for this is that, not only do computer systems tend to add efficiency with task automation, but computer systems can also be easily configured and reconfigured over time for such tasks. For example, if a user finds that one or more application programs are running too slowly, it can be a relatively straightforward matter for the user to add more memory (e.g., RAM), add or swap out one or more processors (e.g., a CPU, GPU, etc.). It may also be a straightforward matter to add or improve the current storage, or even add or replace other peripheral devices that may be used to share or handle the workload. Similarly, it can be relatively straightforward for the user to install or upgrade various application programs on the computer, including the operating system. This tends to be true in theory even on a large, enterprise scale.

In practice, however, the mere ability to add or replace physical computer hardware can often be daunting, particularly on a large scale, sometimes resulting in several hours of extra time to place and configure a new computer system (or upgrade of components). Fortunately, recent developments in virtual machine ("VM") technology have improved or eliminated many of these types of constraints. For example, a virtual machine comprises a set of electronic files that operate as an additional, unique computer system, albeit within the confines and resource limitations of another physical host computer system.

In addition, the set of files for each virtual machine can be easily configured and re-configured in terms of resource access, and there can be several different virtual machines installed on a single physical host accessing the host's resources at different levels. Furthermore, the number of virtual machines—and the resource allocations for each virtual machine—on any given host computer system can be changed from time to time with relative ease. The users of each virtual machine, however, tend to be immune from such changes, and are generally able to access and view each different virtual machine as though it were a separate and distinct physical computer system.

In any event, one will appreciate that the fact an entire computer system can now be represented by a set of files implicates a number of security concerns. This is particularly true of virtual machines that contain high business impact (HBI) data. For example, aside from the fact that virtual machines can be protected to a limited extent with various account-based permission levels, there is relatively nothing that can keep a malicious entity with account access from removing, copying, and/or stealing a virtual machine, and/or misusing the information contained therein. Such possibilities may become more likely as portable storage media, such as portable flash drives, have increasingly greater storage capacity, while at the same time being smaller in physical size. Thus, there is little currently to prevent a user from copying one or more virtual machines onto a flash drive, placing the flash drive in a shirt pocket, and porting the data for unauthorized access at another location.

Conventional solutions to guard against these types of risks might include creating stricter limits on who can access virtual machines with important or sensitive HBI information, and placing all virtual machines that have such HBI information on one server, while leaving virtual machines with less important data on other servers. Such solutions, however, do not address the situation of how to secure the virtual machine once stolen, and still depend primarily on various trust levels with the end-user (which still may not be as reliable as preferred). Furthermore, such precise segmentation and division among virtual machines may not always practical, since it may not always be clear which virtual machines need to be more heavily secured, and which virtual machines do not. Thus, it is more often the case that servers hosting virtual machines with HBI data, and hence accessible to users with high trust credentials, will also be hosting virtual machines that are accessible to users with relatively low trust credentials.

Accordingly, there are a number of difficulties with managing virtual machine access in a secure way that can be addressed, particularly where large numbers of virtual machines may be used at a time. One will appreciate that such concerns are becoming increasingly acute as many organizations use virtualization machines at ever higher rates, and sometimes can lose track of what various virtual machines are doing, as well as what file or application access each virtual machine may have.

BRIEF SUMMARY

Implementations of the present invention overcome one or more problems in the art with systems, methods, and computer program products configured to secure virtual machine access in a highly efficient and organized manner. In at least one implementation, for example, each virtual machine comprises a unique identifier, and one or more virtual hard drives. A management service associates the unique identifier for each virtual machine with one or more encryption keys (public or private), which, in turn, are used to encrypt the contents of the virtual machine's virtual hard drives. In addition, encryption keys can be distributed in an organized fashion so that only some servers receive certain keys, while other servers receive other keys. Each encrypted virtual machine, therefore, can only be accessed and operated on a physical host that has the appropriate encryption key associated with that virtual machine.

For example, a method in accordance with an implementation of securely managing one or more virtual machines on one or more physical hosts can involve creating one or more virtual machines on one or more physical hosts, where each of the one or more virtual machines comprises a unique ID, and is associated with one or more virtual hard disks. The method can also involve associating an encryption key with one or more of the one or more virtual machine unique IDs. In addition, the method can involve encrypting one or more of the one or more virtual hard disks for each of the one or more virtual machines associated with the encryption key.

Furthermore, the method can involve providing the encryption key to one or more hypervisor components that interface between the virtual machines and the associated one or more virtual hard disks. The one or more hypervisor components provide read/write access of the one or more encrypted drives to the corresponding virtual machine using the provided encryption key.

In addition to the foregoing, an alternate method in accordance with an implementation of the present invention of securely migrating virtual machines between physical hosts can involve providing one or more encryption keys to a plurality of different physical hosts on which are executed one or more virtual machines. The method can also involve associating one or more virtual machines with each of the one or more encryption keys.

In addition, the method can involve correlating into one or more groups one or more virtual machines and one or more physical hosts with one or more common encryption keys per each group. Furthermore, the method can involve migrating any of the virtual machines to any physical host within the group that comprises an appropriate encryption key. As such, migration of the virtual machine outside of the group renders the virtual machine inaccessible.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a flowchart comprising a series of one or more acts in a method of using encryption keys to provide read/write access to one or more virtual machines; and FIG. 4 illustrates a flowchart comprising a series of one or more acts in a method of migrating virtual machines to one or more physical hosts having the appropriate encryption keys.

DETAILED DESCRIPTION

Implementations of the present invention extend to systems, methods, and computer program products configured to secure virtual machine access in a highly efficient and organized manner. In at least one implementation, for example, each virtual machine comprises a unique identifier, and one or more virtual hard drives. A management service associates the unique identifier for each virtual machine with one or more encryption keys (public or private), which, in turn, are used to encrypt the contents of the virtual machine's virtual hard drives. In addition, encryption keys can be distributed in an organized fashion so that only some servers receive certain keys, while other servers receive other keys. Each encrypted virtual machine, therefore, can only be accessed and operated on a physical host that has the appropriate encryption key associated with that virtual machine.

Accordingly, and as will be appreciate more fully herein, implementations of the present invention provide that a single virtual machine, and/or a group of virtual machines can be "corralled." When a virtual machine is created, the virtual machine can be assigned a unique identifier called the virtual machine ID (VMID). In one implementation, a certificate can be used to uniquely associate a virtual machine ID with an encryption key. This certificate can be created or supplied any number of ways, such as being automatically generated by the virtual machine management service (e.g., 130), or being supplied by the user.

The virtual machine management service then uses the encryption key to encrypt the virtual hard disk(s) containing the files of the virtual machine. Every time the virtual machine writes to the virtual hard disk(s), the virtualization platform (e.g., "hypervisor") on which the virtual machine is executed can use the encryption key to encrypt the contents. Similarly, when the virtualization platform reads the contents of the virtual hard disk(s), the virtualization platform can use the appropriate encryption key to decrypt the contents. Hence, if a user manually copies the virtual hard disk to another physical host (or "virtualization host") or to a portable storage device, the user will not be able to access the contents of the virtual hard disk unless the user also has the appropriate encryption key.

As also understood more fully herein, therefore, the virtual machine can be migrated to only those one or more physical host(s) that contain the appropriate encryption key. To enable such migration, an administrator might, at the time the virtual machine is created, distribute the certificate for the created virtual machine to a set of virtualization hosts that are allowed to operate the virtual machine. It is only these virtualization hosts that can then host this virtual machine due to the presence of the appropriate encryption key.

Figure 1A:
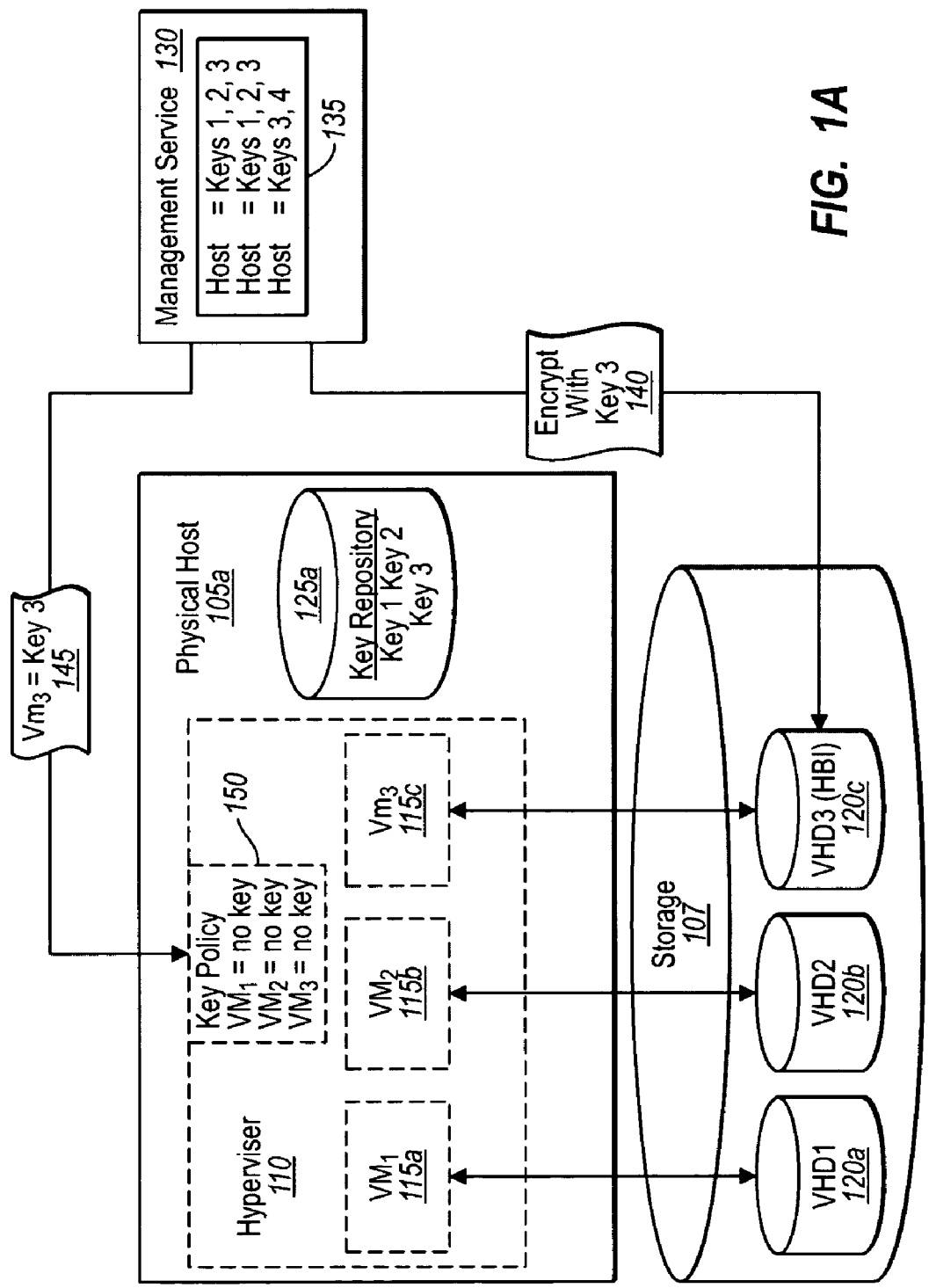
FIG. 1A illustrates an overview schematic diagram in accordance with an implementation of the present invention in which a management service provides one or more encryption keys to a physical host, and further directs encryption of a virtual hard disk.

Referring now to the Figures, FIG. 1A illustrates an overview schematic diagram in accordance with an implementation of the present invention in which a management service manages virtual machine access on a physical host using encryption keys. For example, FIG. 1A shows that a virtualization environment can comprise at least one physical host 105a, which provides the various physical hardware resources that are used by each virtual machine. In particular, each physical host 105a typically comprises a physical machine having a set of memory resources, a set of processing resources, and access to one or more storage devices 107.

FIG. 1A further shows that physical host 105*a* further comprises a plurality of virtual machines 115*a*, 115*b*, and 115*c* installed thereon. Each such virtual machine 115, in turn, comprises a unique identifier (or "unique ID"), which is typically supplied by the management service 130 upon creation. For example, FIG. 1A shows that virtual machine 115*a* comprises the unique ID of "$VM_1$," while virtual machines 115*b* and 115*c* each comprise the unique IDs "$VM_2$," and "$VM_3$," respectively. FIG. 1A also shows that each virtual machine 115 further comprises access to one or more virtual hard disks 120. For example, FIG. 1A shows that virtual machine 115*a* comprises access to virtual hard disk 130*a*, while virtual machines 115*b* and 115*c* each comprise access to virtual hard disks 130*b*, and 130*c*, respectively. In this case, FIG. 1A shows that storage 107 is a separate component from physical host 105*a*, although one will appreciate that storage 107 can represent any form of remote or local storage that is partitioned for use and access for virtual hard disks 129.

In addition, FIG. 1A shows that each virtual machine 115 operates within a virtualization platform that is executed through a physical host 105*a* entity, such as a "hypervisor" 110. In general, a hypervisor 110 comprises one or more sets of computer-executable instructions that execute each virtual machine 115 on a physical host 130, and direct read/write access by the virtual machines 115 to a particular virtual hard disk 130. The hypervisor 110 also maintains the separate scope or execution environment of each particular virtual machine 115. Thus, in at least one implementation, the hypervisor 110 ensures that each virtual machine 115 maintains a separate identity, and is otherwise unaware of another virtual machine on the host 105*a*, except as may be discoverable through network communication. That is, the hypervisor 110 provides a veil between each virtual machine 115, whereby each virtual machine operates as though it has total access to all available resources (but only sees what is assigned).

As shown in FIG. 1A, the hypervisor 110 and management service 130 operate in tandem, not only to correlate virtual machines with various encryption keys, but also to encrypt virtual hard disk contents. For example, FIG. 1A shows that management service 130 comprises at least a database of relationships between physical hosts and various encryption keys. In particular, FIG. 1A shows that management service 130 comprises a set of information indicating that physical host 105*a* has access to encryption keys 1, 2, and 3. For example, FIG. 1A shows that, in this particular illustration, management service 130 has previously provided physical host 105*a* with encryption keys 1, 2, and 3 in key repository 125*a*.

In addition, FIG. 1A illustrates an implementation in which management service 130 correlates and/or organizes the relationships between each virtual machine 115 and a particular encryption key. For example, FIG. 1A shows that management service 130 sends one or more messages 145 to hypervisor 110 to indicate that virtual machine 115*c* is to be associated with encryption key 3. As previously mentioned, these one or more messages 145 can comprise a certificate that represents a particular encryption key. One will appreciate that the specific type of encryption key is not meant to be limiting. In particular, implementations of the present invention can be used with any form of private or public encryption key and/or any form of symmetric or asymmetric encryption methods. Furthermore, as also previously mentioned, a user can provide the certificate, rather than the certificate/message being provided only via a management service 130 as illustrated.

In any event, FIG. 1A shows that hypervisor 110 can maintain one or more local policy files, such as policy file 150, which includes each of the various encryption key/virtual machine relationships that have been provided. One will appreciate that there may, in some cases, also be a need to provide an encryption key escrow service, depending on the encryption laws of a particular legal jurisdiction. Thus, in such cases, a user or management service might also send one or more certificates to a third-party service in addition to what is illustrated herein. The present illustrations, therefore, omit the escrow service for purposes of convenience in description.

In any event, FIG. 1A shows that management service 130 uses "key 3" to encrypt the virtual hard disk 120*c* associated with virtual machine 115*c*. In particular, FIG. 1A shows that management service 130 sends one or more messages 140, which, when executed, cause virtual hard disk 120*c* to encrypt its contents with encryption key 3. Of course, in additional or alternative implementations, a user independently can direct encryption of a particular virtual hard disk without intervention or direction by management service 130.

However done, management service 130 (or the user) need not necessarily encrypt an existing virtual hard disk 120 that is already in use (e.g., virtual hard disk 120*c*). Rather, in at least some implementations, management service 130 (or a user) can additionally or alternatively pull/copy a previously encrypted virtual hard disk from a library (not shown), and pass that virtual hard disk to storage 107. Management service 130 can then configure the newly installed virtual hard disk pulled from the library. In either case, not only will hypervisor 110 be made aware of the new, already encrypted, virtual machine 115, but hypervisor 110 will also be presented with a corresponding encryption key for that virtual hard disk 120.

Figure 1B:
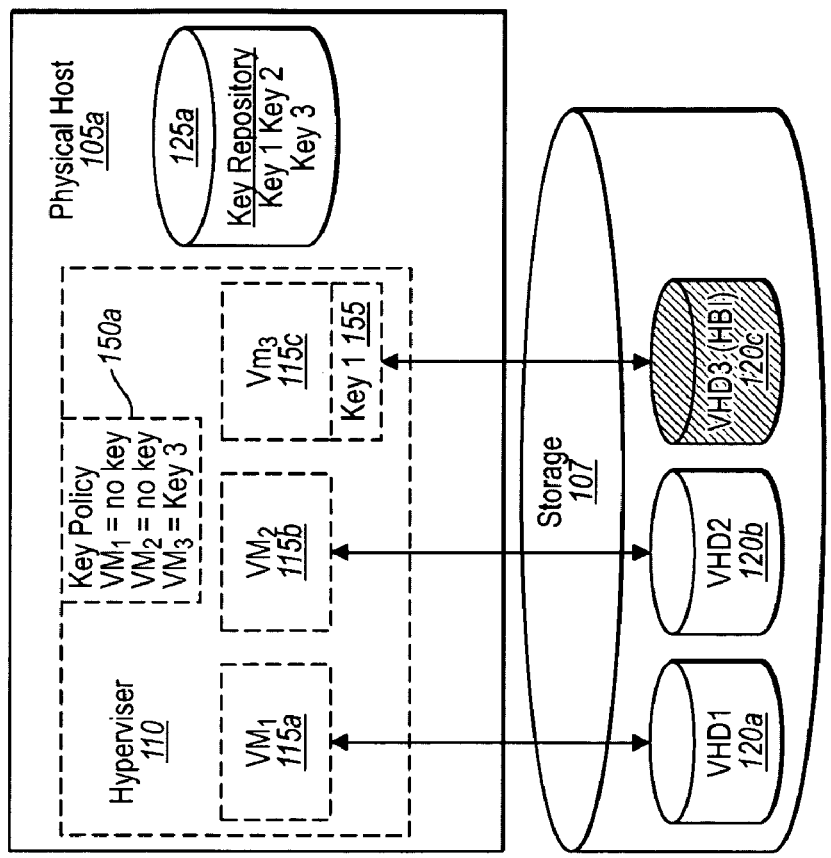
FIG. 1B illustrates the schematic diagram of FIG. 1A in which a virtual machine uses the provided encryption key to communicate with the encrypted virtual hard disk(s)

Along these lines, FIG. 1B illustrates the schematic diagram of FIG. 1A in which virtual machine 115*c* uses the provided encryption key ("key 3") to communicate with an encrypted virtual hard disk(s). (Specifically, virtual hard disk 120*c* is shaded in this illustration to show that it is encrypted.) In at least one implementation, hypervisor 110 can install or otherwise provide a new interface layer 155 between virtual machine 115*c* and virtual hard disk 120*c*. The new interface layer 155, in turn, can be configured to use the corresponding encryption key (in this case "key 3") to communicate with virtual hard disk 120*c*. Thus, for example, as shown in FIG. 1B, interface 155 uses key 3 to decrypt the contents of virtual hard disk 120*c* as these contents are read, and further uses key 3 to encrypt any new writes to virtual hard disk 120*c* using key 3.

In addition to the foregoing, FIG. 1B shows that virtual machines 115*a* and 115*b* have not been associated with an encryption key, and thus, management service 130 (or an individual user) has not yet encrypted their corresponding virtual hard disks 120*a* and 120*b*, respectively. Accordingly, FIG. 1B illustrates yet another aspect of implementations of the present invention, which includes differential encryption (or non-encryption) of several different virtual hard disks, potentially even on the same server. That is, management service 130 can encrypt all virtual hard disks 120 managed through the same server/host using the same encryption key, and/or can encrypt only certain virtual hard disks with specific encryption keys, and can even differentiate physical hosts by encryption keys. As understood more fully below, this differential provisioning of encryption keys can be used to group virtual machines, and render some virtual machines inoperable/inaccessible even if operated within the same organization.

Figure 2A:
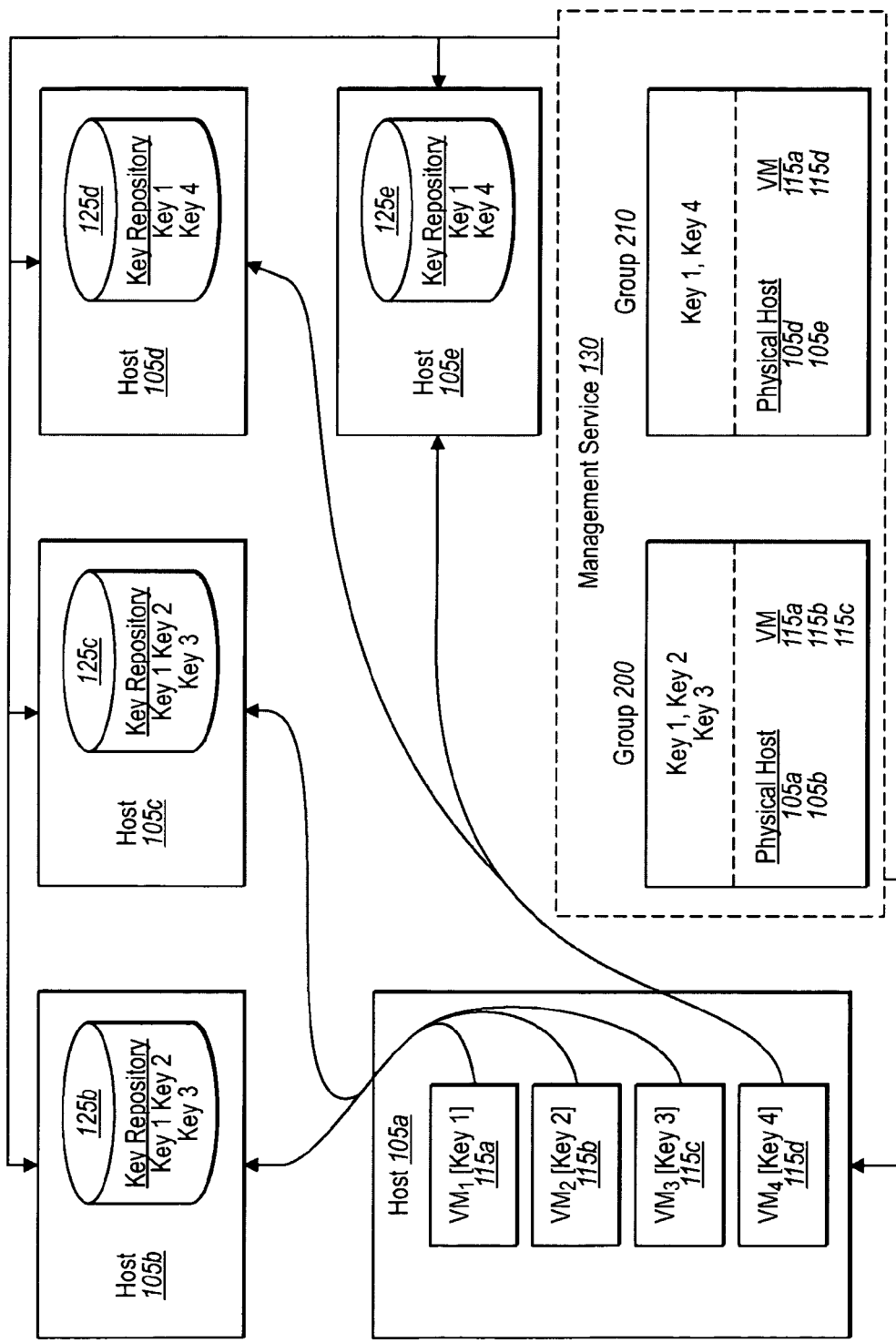
FIG. 2A illustrates an overview schematic diagram in accordance with an implementation of the present invention in which one or more virtual machines are copied or migrated over to one or more other physical hosts.

Along these lines, FIG. 2A illustrates an overview schematic diagram in which one or more virtual machines are copied over to one or more other physical hosts. For example, management service 130 receives one or more requests to decommission physical host 105a, and thus needs to move each of the virtual machines contained therein to another physical host. Alternatively, a system C Z administrator may desire to copy or move the virtual machines 115a, 115b, 270, or 280 from physical host 105a to other physical hosts (105b, 105c, etc.) for load balancing issues. However performed, implementations of the present invention ensure that virtual machines can only be accessed on physical hosts that have the appropriate encryption keys.

For example, FIG. 2A shows that each of the virtual machines 115a, 115b, 115c, 115d is associated with a unique encryption key, similar to that shown in FIG. 1A-1B. In particular, FIG. 2A shows that virtual machine 115a has been associated with encryption key 1, while virtual machines 115b, 115c, and 115d have been associated with corresponding encryption keys 2, 3, and 4, respectively. One will appreciate, however, that it is not required that each different virtual machine be encrypted with a separate and distinct encryption key. For example, in at least one implementation, virtual machines 115a and 115b (or all the virtual machines in a particular physical host 105) might both be encrypted with encryption key 1, and so forth. In any event, FIG. 2A shows that management service 130 maintains or "corrals" each of these different encryption keys (as well as virtual machines 115 and physical hosts 105) in terms of particular "groups."

For example, FIG. 2A shows that one group 200 includes physical hosts 105b and 105c, as well as virtual machines 115a, 115b, 115c, and a relationship with keys 1, 2, and 3. This means that physical hosts 105b and 105c will each receive and store (in repository 125b, or 125c, respectively) a copy of encryption keys 1, 2, and 3, and that the virtual machines 115 associated with these keys include virtual machines 115a, 115b, and 115c. Similarly, FIG. 2A shows that another group 210 includes physical hosts 105d and 105e, as well as virtual machines 115a, and 115d, and a relationship with keys 1, and 4. This means that physical hosts 105d and 105e will each receive and store (in repository 125d, or 125e, respectively) a copy of encryption keys 1, 4, and that the virtual machines associated with these keys include virtual machines 115a and 115d. (Furthermore, this also indicates that migration/copying of virtual machines can effectively be "de-coupled" from migration and/or copying of encryption keys from one physical host to another.)

One will appreciate that there are a number of ways and means that can drive these particular groupings. For example, an administrator might direct key 1 to be associated with a generic-type of virtual machine that is common among on all virtual machines in a server farm, such as a virtual machine that handles directory or contact data. By contrast, the administrator might direct keys 2, 3, and 4 to be distributed on a more limited basis, so that keys 2 and 3 are used by an accounting group, or an engineering group, while key 4 is used by human resources. Accordingly, the administrator might configure physical hosts 105b and 105c so that only virtual machines corresponding to engineering or accounting departments are installed thereon, while administration or human resources virtual machines are installed only on physical hosts 105d and 105e.

In addition, and in at least one implementation, groupings can be made based on certain understandings of trust levels for each different virtual machine and each corresponding physical host. That is, groups could also be generalized in terms of high-trust and low-trust groups, which may be further driven not only by the accessibility of a given virtual machine or physical host, but also based on the sensitivity of data contained therein (e.g., high business impact, or HBI, data). Thus, there are a number of considerations that can drive the various virtual machine groupings.

Figure 2B:
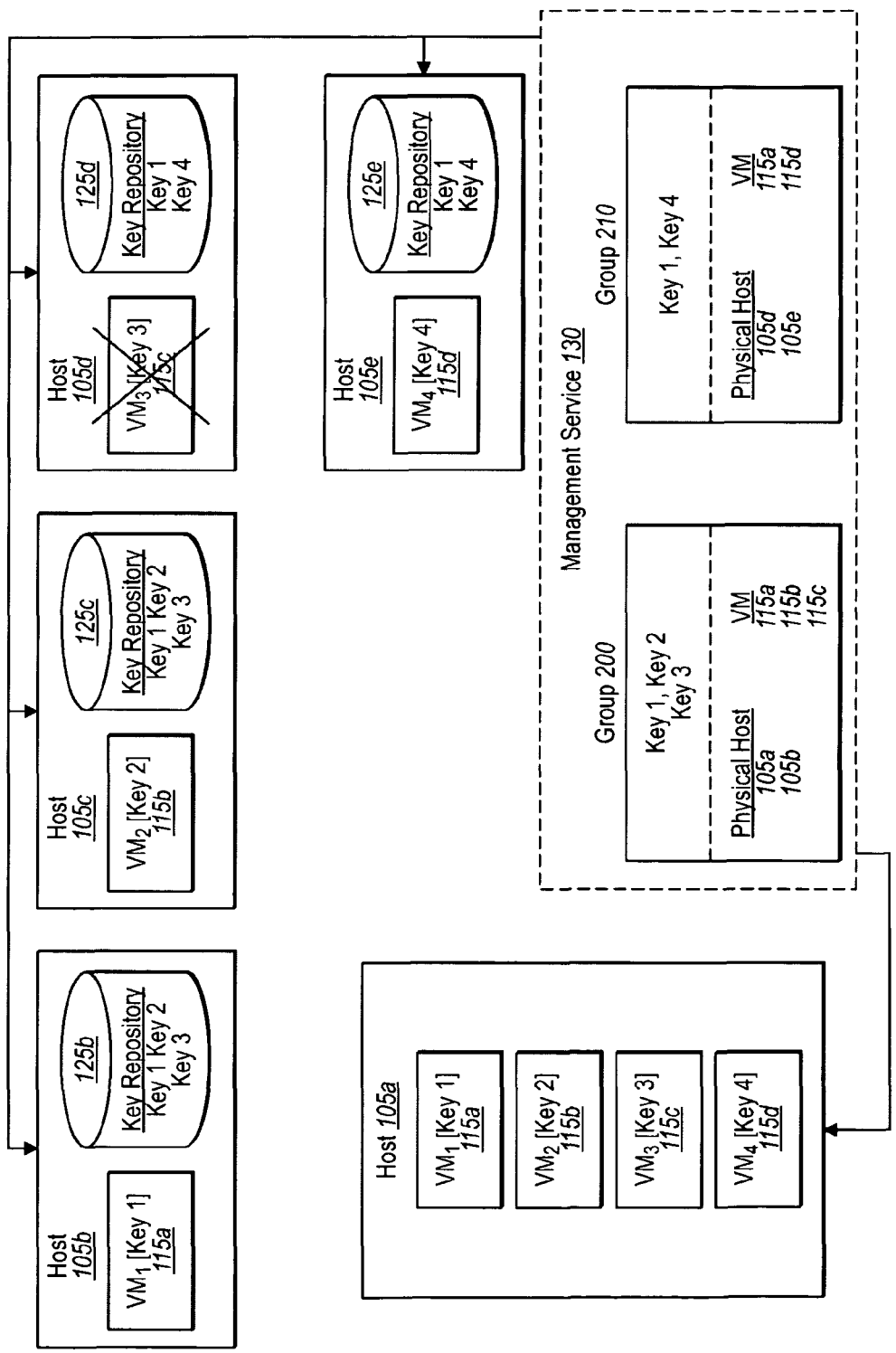
FIG. 2B illustrates the schematic diagram of FIG. 2A in which those physical hosts that have received one or more virtual machines and the appropriate encryption keys are able to access and operate the copied virtual machines.

However configured, FIGS. 2A and 2B show that these particular key groupings limit where particular virtual machines can be accessed or operated, and, to some extent, transferred. For example, FIG. 2A shows that an administrator/user (e.g., of host 105a) initiates one or more transfer/copy commands to add virtual machine 115a to physical host 125b, and to add virtual machine 115b to physical host 105c. In addition, the administrator initiates one or more transfer/copy commands to add virtual machine 115c to physical host 105d and virtual machine 115d to physical host 105e. There may be any number of reasons to move these virtual machines to these other hosts, such as moving the machines as part of a load balancing effort, or moving the machines as part of an effort to temporarily decommission physical host 105a.

As a result, since virtual machines 115a and 115b are associated with keys 1 and 2, respectively, and further since these particular keys are already stored in repositories 125b and 125c (in this case before the virtual machine is copied over), virtual machines 115a and 115b can be properly accessed and executed at physical hosts 105b and 105c when installed thereon. That is, the local hypervisor 110 components at these respective physical hosts 105b and 105c will be able to generate the appropriate interfaces 155, and use the appropriate keys to read and write to the corresponding encrypted virtual hard disks associated with virtual machines 115a and 115b.

Similarly, since virtual machine 115d is associated with key 4, and further since key 4 is stored in repository 105e, virtual machine 115d (i.e., the encrypted virtual hard disk contents) can be properly accessed and executed at (or through) physical host 105e once copied over and installed thereon. FIG. 2A, however, shows that virtual machine 115c is associated with key 3, which key is not stored in physical host 105d. In this particular case, therefore, since the administrator incorrectly copied virtual machine 115c to a host without the appropriate encryption key, virtual machine 115c will be inoperable or otherwise inaccessible until physical host 105d receives a copy of encryption key 3.

One will appreciate that there can be a number of mechanisms that could follow from this particular event. For example, management service 130 could identify that host 115d does not have key 3 when at some point detecting an attempt to operate virtual machine 115c at host 105d. The management service 130 (or administrator/user operating the service) could then determine whether to provide key 3 to repository 125d. If determining that the key should now be provided, management service 130 could then automatically send the key so that the corresponding hypervisor 110 at host 105d can then set up the appropriate interface and use the virtual machine 115c. Alternatively, if the key should not be provided, management service 130 could generate one or more warning or error messages. For example, management service 130 could generate a warning message that indicates that there has been an inappropriate or unauthorized attempt to access encrypted data, and send the alert to the appropriate system administrator.

Accordingly, FIGS. 1A through 2B illustrate a number of components, modules, and schematics for distributing and limiting virtual machine access on a relatively granular basis, and particularly beyond the conventional controls otherwise provided through username/password-style access. In addition to the foregoing, implementations of the present invention can also be described in terms of flowcharts comprising one or more acts in a method for accomplishing a particular result. For example, FIGS. 3 and 4 illustrate alternative flowcharts from the perspective of a management service for limiting and/or organization access to virtual machines, and for migrating virtual machines based on encryption key associations. The acts of FIGS. 3 and 4 are described below with respect to the components and diagrams of FIGS. 1A-2B.

For example, FIG. 3 shows that a method from the perspective of a management service 130 of managing access of one or more virtual machines on one or more physical hosts can comprise an act 300 of creating a virtual machine with a unique ID. Act 300 includes creating one or more virtual machines on one or more physical hosts, wherein each of the one or more virtual machines comprises a unique ID, and is associated with one or more virtual hard disks. For example, FIG. 1A shows that virtual machines 115a, 115b, and 115c each comprise a unique identifier (i.e., "VM$_1$," "VM$_2$," and "VM$_3$"). Each of these virtual machines 115a-c is, in turn, associated with a particular virtual hard disk 120a, 120b, and 120c, respectively.

FIG. 3 also shows that the method can comprise an act 310 of associating an encryption key with the unique ID. Act 310 includes associating an encryption key with one or more of the one or more virtual machine unique IDs. For example, FIG. 1A shows that management service 130 indicates that physical host 105 is designated to store encryption keys 1, 2, and 3. In addition, management service 130 correlates virtual machine 115c with encryption key 3.

In addition, FIG. 3 shows that the method can comprise an act 320 of encrypting a virtual hard disk with the encryption key. Act 320 includes encrypting one or more of the one or more virtual hard disks for each of the one or more virtual machines associated with the encryption key. For example, FIG. 2A shows that management service 130 sends one or more sets of instructions 140 to storage 170, which, when executed, cause virtual hard disk 120c to be encrypted with key 3. Of course, in additional or alternative implementations, management service 130 simply installs virtual hard disk 120c for the first time already encrypted with key 3, and, in such an implementation, may just pull virtual hard disk 120c from a library.

Furthermore, FIG. 3 shows that the method can comprise an act 330 of using the encryption key to provide read/write access to the virtual hard disk. Act 330 includes providing the encryption key to one or more hypervisor components that interface between the virtual machines and the associated one or more virtual hard disks, wherein the one or more hypervisor components provide read/write access of the one or more encrypted drives to the corresponding virtual machine using the provided encryption key. For example, FIG. 1A shows that management service 130 sends one or more messages 145 (or certificates) to hypervisor 110, which associates virtual machine 115c with encryption key 3. As shown in FIG. 1B, hypervisor 110 then uses one or more interfaces 155 to provide virtual machine 115c with read/read access to virtual hard disk 120c using key 3.

In addition to the foregoing, FIG. 4 illustrates that an additional or alternative method from the perspective of the management service 130 of migrating one or more virtual machines between physical hosts can comprise an act 400 of providing an encryption key to a plurality of physical hosts. Act 400 includes providing one or more encryption keys to a plurality of different physical hosts on which are executed one or more virtual machines. For example, FIG. 2A shows that management service 130 has provided keys 1, 2, and 3 to physical hosts 105b and 105c, while otherwise providing keys 1 and 4 to physical hosts 105d and 105e.

FIG. 4 also shows that the method can comprise an act 410 of associating a virtual machine with the encryption key. Act 410 includes associating one or more virtual machines with each of the one or more encryption keys. For example, FIG. 2A shows that virtual machines 115a and 115b are associated with keys 1 and 2, respectively, while virtual machines 115c and 115d are associated with keys 3 and 4, respectively.

In addition, FIG. 4 shows that the method can comprise an act 420 of creating a group of virtual machines and physical hosts based on the encryption key. Act 420 includes correlating into one or more groups one or more virtual machines and one or more physical hosts with one or more common encryption keys per each group. For example, FIG. 2A shows that management service 130 correlates physical hosts 105b and 105c with keys 1, 2, and 3 in group 200. These keys, in turn, are associated with virtual machines 115a, 115c, and 115c. Similarly, FIG. 2A shows that group 210 associates physical hosts 105d and 105e with encryption keys 1 and 4, and hence virtual machines 115a and 115d.

Furthermore, FIG. 4 shows that the method can comprise an act 430 of migrating the virtual machine to the physical hosts within the crated groups. Act 430 includes migrating any of the virtual machines to any physical host within the group that comprises an appropriate encryption key, wherein migration of the virtual machine outside of the group renders the virtual machine inaccessible. For example, FIG. 2B shows that virtual machines 115a, 115b, and 115d have been migrated within their respective groups (i.e., to from physical host 105a to physical host 105b, c, or d, which have received the appropriate keys), and are thus accessible. By contrast, FIG. 2B also shows that virtual machine 115c has been migrated outside of its group, or to a physical host 105d that does not have stored thereon the appropriate encryption key (i.e., key 3 in this case), and thus virtual machine 115c is currently inaccessible/inoperable.

One will appreciate, therefore, that implementations of the present invention provide a number of solutions not only for securely managing access to virtual machines, but also for securely moving virtual machines within a particular operating environment. One will further appreciate that the solutions and mechanisms provided herein are "guest OS"-agnostic, since the operating system running in the VM is unaware that the data are being encrypted. In this case, certain enlightened guest operating systems may disable their own encryption logic, and alternatively use the encryption key mechanisms described herein.

One will further appreciate that implementations of the present invention can also be practiced using a number of different securing mechanisms, in addition to or in lieu of the encryption key mechanisms described herein. For example, another similar or alternative implementation of the present invention involves being able to manipulate virtual trusted platform module (TPM) hardware to facilitate the migration of a virtual machine from one physical host to another. In particular, the management service 103 could create a virtual machine 115 with the appropriate TPM signatures. The guest operating system (for physical host 105) could then drive encryption. Groups of virtual machines would then each need to have the same set of TPM signatures, as the corresponding chips at each physical host in the group would also need to have the same sets of TPM signatures for the group.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a management service in a computerized environment comprising one or more virtual machines and one or more virtual hard disks corresponding to each of the one or more virtual machines, a method of securely managing the one or more virtual machines on one or more physical hosts using one or more encryption keys, comprising the acts of:
   creating one or more virtual machines on the one or more physical hosts, wherein each of the one or more virtual machines comprises a unique ID, and is associated with the one or more virtual hard disks;
   associating an encryption key with one or more of the one or more virtual machine unique IDs;
   encrypting, using the encryption key, one or more of the one or more virtual hard disks for each of the one or more virtual machines associated with the encryption key;
   providing the encryption key to one or more hypervisor components that interface between the virtual machines and the associated one or more virtual hard disks, wherein the one or more hypervisor components provide read/write access of the one or more encrypted drives to the corresponding virtual machine using the provided encryption key, the one or more hypervisor components maintain a separate scope and execution environment for each of the one or more virtual machines such that each virtual machine has a separate identity and operates as though it has complete access to all available resources but has visibility only to what is assigned to it by the hypervisor;
   receiving one or more requests to move a virtual machine from one of the one or more physical hosts to another physical host, the virtual machine having one of the encrypted one or more virtual hard disks and a corresponding encryption key; and
   determining if the another physical host has a copy of the corresponding encryption key.

2. The method as recited in claim 1, wherein the act of providing the encryption key to one or more hypervisor components further comprises sending the encryption key to a particular physical host at which the corresponding virtual machine is executed.

3. The method as recited in claim 1, wherein the act of providing the encryption key to one or more hypervisor components further comprises sending one or more messages to the physical host that associate the encryption key and the corresponding virtual machine.

4. The method as recited in claim 1, further comprising an act of encrypting one or more additional virtual hard disks with one or more different encryption keys.

5. The method as recited in claim 4, further comprising sending one or more messages to the physical host that associates each corresponding virtual machine with one of the one or more different encryption keys.

6. The method as recited in claim 5, further comprising organizing a plurality of the one or more virtual machines by encryption key into a plurality of different groups.

7. The method as recited in claim 6, wherein one group comprises all of the one or more virtual machines corresponding to a virtual hard disk that was encrypted with the encryption key, and another group comprises all of the one or more virtual machines corresponding to a virtual hard disk encrypted with at least one of the one or more different encryption keys.

8. The method as recited in claim 1, wherein encrypting at least one of the one or more virtual hard disks occurs upon creation of the at least one of the one or more virtual hard disks.

9. The method as recited in claim 1, further comprising the acts of:
   receiving one or more requests to create a particular virtual machine at the physical host; and
   determining which of the one or more encryption keys are stored at the physical host.

10. The method as recited in claim 9, further comprising an act of identifying one or more encrypted virtual hard disks in a virtual hard disk library, wherein the one or more encrypted virtual hard disks have been encrypted with one of the encryption keys determined to be stored at the physical host.

11. The method as recited in claim 10, further comprising an act of copying one or more of the one or more encrypted virtual hard disks in the library to a storage component that is managed by the physical host.

12. The method as recited in claim 11, further comprising an act of installing a virtual machine at the physical host, the virtual machine corresponding to the copied, encrypted virtual hard disk, wherein the installed virtual machine comprises a unique ID that is associated with the encryption key used to encrypt the copied, encrypted virtual hard disk.

13. The method as recited in claim 1, further comprising an act of, if the other physical host does not have the copy of the corresponding encryption key:
   determining that the physical host can receive the corresponding encryption key based on one or more trust levels; and
   providing the copy of the corresponding encryption key to the other physical host.

14. At a management service in a computerized environment comprising one or more virtual machines and one or more virtual hard disks corresponding to each of the one or more virtual machines, a computer program storage product having computer-executable instructions stored thereon that, when executed, cause one or more processors in a computer system to perform a method comprising:
- creating one or more virtual machines on one or more physical hosts, wherein each of the one or more virtual machines comprises a unique ID, and is associated with one or more virtual hard disks;
- associating an encryption key with one or more of the one or more virtual machine unique IDs;
- encrypting one or more of the one or more virtual hard disks for each of the one or more virtual machines associated with the encryption key;
- providing the encryption key to one or more hypervisor components that interface between the virtual machines and the associated one or more virtual hard disks, wherein the one or more hypervisor components provide read/write access of the one or more encrypted drives to the corresponding virtual machine using the provided encryption key, the one or more hypervisor components maintain a separate scope and execution environment for each of the one or more virtual machines such that each virtual machine has a separate identity and operates as though it has complete access to all available resources but has visibility only to what is assigned to it by the hypervisor;
- receiving one or more requests to move a virtual machine from one of the one or more physical hosts to another physical host, the virtual machine having one of the encrypted one or more virtual hard disks and a corresponding encryption key; and
- determining if the another physical host has a copy of the corresponding encryption key.

* * * * *